United States Patent

Hausam

[11] Patent Number: 5,341,961
[45] Date of Patent: Aug. 30, 1994

[54] COFFEE DISPENSER WITH AGITATOR

[76] Inventor: Leonard P. Hausam, 6801 50th Ave. N., Crystal, Minn. 55428

[21] Appl. No.: 879,752

[22] Filed: Dec. 11, 1991

[51] Int. Cl.⁵ .............................................. G01F 11/00
[52] U.S. Cl. ..................... 222/217; 222/245; 222/308; 222/362
[58] Field of Search ............... 222/185, 217, 231, 234, 222/245, 308, 362

[56] References Cited

U.S. PATENT DOCUMENTS

| | | | |
|---|---|---|---|
| 778,515 | 12/1904 | Trefny | 222/231 X |
| 1,846,775 | 2/1932 | Wegmann et al. | 222/245 |
| 2,054,522 | 9/1936 | Richert | 222/217 |
| 2,237,189 | 4/1941 | McCormak et al. | 222/245 |
| 2,529,445 | 11/1950 | Betz | 222/217 |
| 4,168,019 | 9/1979 | Hausam | 222/308 X |

Primary Examiner—Gregory L. Huson
Attorney, Agent, or Firm—John W. Adams

[57] ABSTRACT

A coffee dispenser particularly constructed to measure and dispense finely ground powdered coffee by providing an agitator for the lower portion of the hopper including an agitator portion moving through the discharge opening of the hopper to positively prevent bridging and clogging of the powdered coffee in the bottom portion of the hopper.

5 Claims, 2 Drawing Sheets

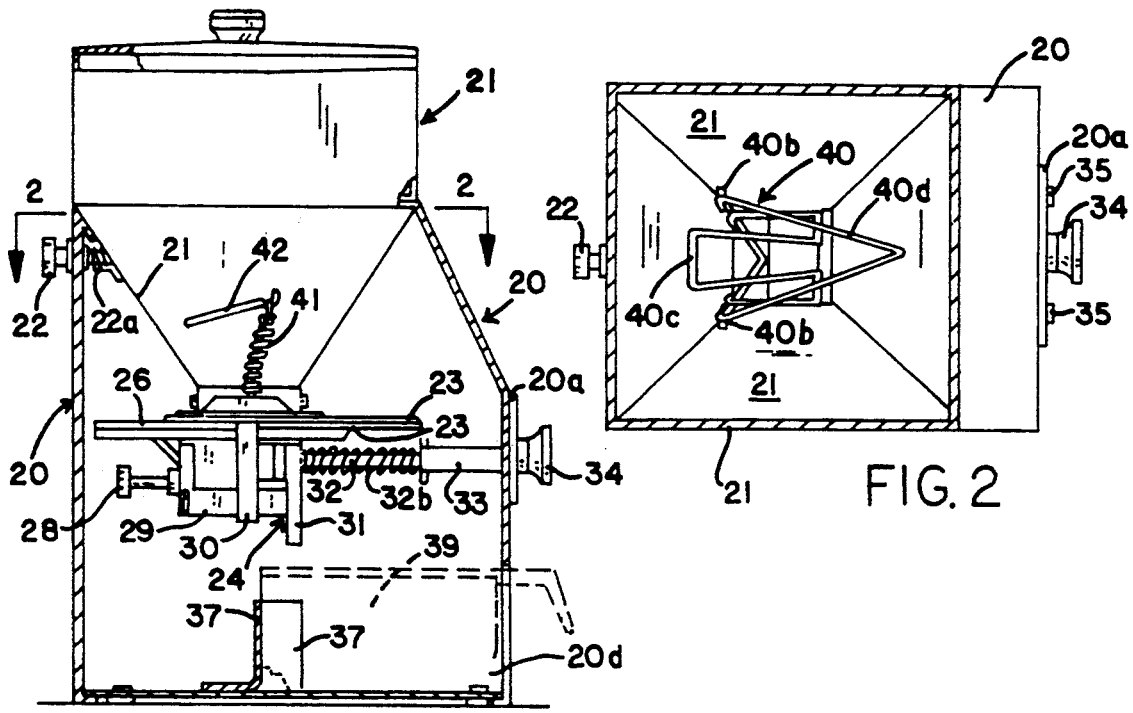
FIG. 1
FIG. 2
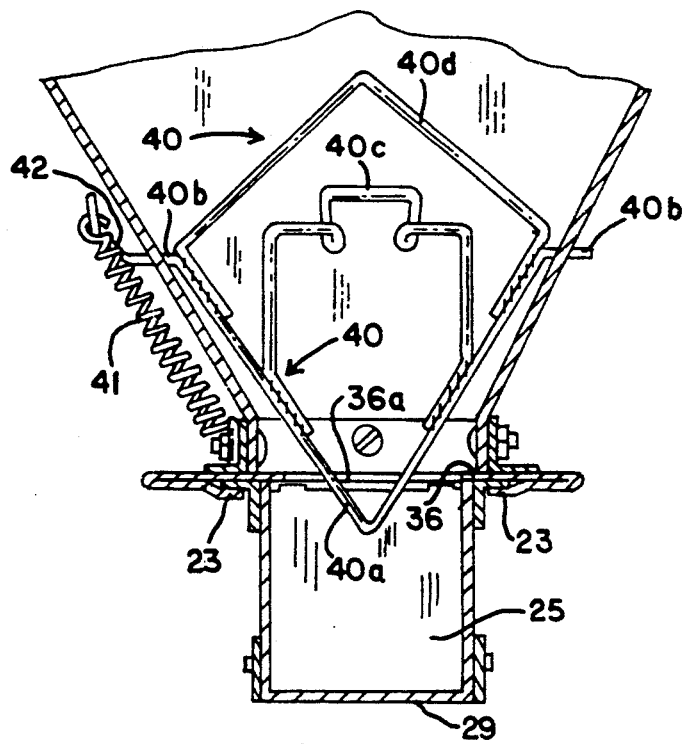
FIG. 3

COFFEE DISPENSER WITH AGITATOR

BACKGROUND OF THE INVENTION

The coffee dispenser described in my prior U.S. Pat. No. 4,168,019 issued Sep. 18, 1979, has worked satisfactorily for coffee that is ground in a normal fashion. In recent years, however, in order to increase the soluability of ground coffee and thereby increase the yield thereof, manufacturers have adopted the practice of finely grinding the coffee into a powder which also releases and exposes the oil of the coffee bean on the outside of the powder particles This oil tends to make these small particles sticky, which combines with the reduced size of the particles to cause bridging within the supply hopper of the coffee dispensers.

SUMMARY OF THE INVENTION

The present invention is designed to produce agitation of the coffee within the hopper and also reduce the size of the dispensing chamber and thus permit reducing the individual batch size being dispensed without changing the basic size or construction of the specific measuring and dispensing mechanism embodied in the coffee dispensers being manufactured by applicant as identified in applicant's prior patent. The agitator element is mounted in the bottom and lower portion of the hopper and is actuated by the measuring and dispensing mechanism to positively prevent bridging and clogging of the coffee passing through the discharge opening of the hopper.

DESCRIPTION OF THE DRAWINGS

FIG. 1 is a vertical sectional view through the housing;

FIG. 2 is a horizontal sectional view taken substantially along the Line 2—2 of FIG. 1;

FIG. 3 is a sectional view taken substantially along the Line 3—3 of FIG. 5 and showing the trap door of the measuring compartment in open discharging position;

DETAILED DESCRIPTION OF THE PREFERRED EMBODIMENT

Figure 4:
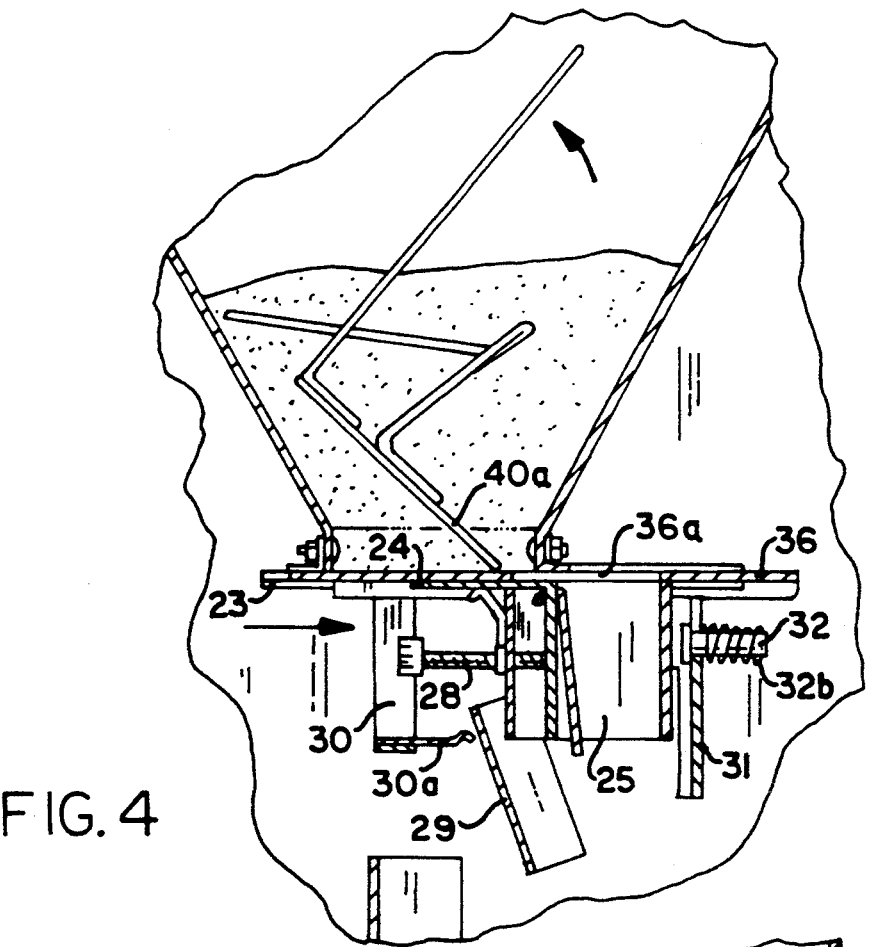
FIG. 4 is a sectional view through the measuring and dispensing mechanism and showing the slide closure in closed position with the agitator supported thereon; and, FIG. 5 is a similar view to FIG. 4 showing the slide closure in open position to discharge the coffee into the measuring compartment.
Figure 5:
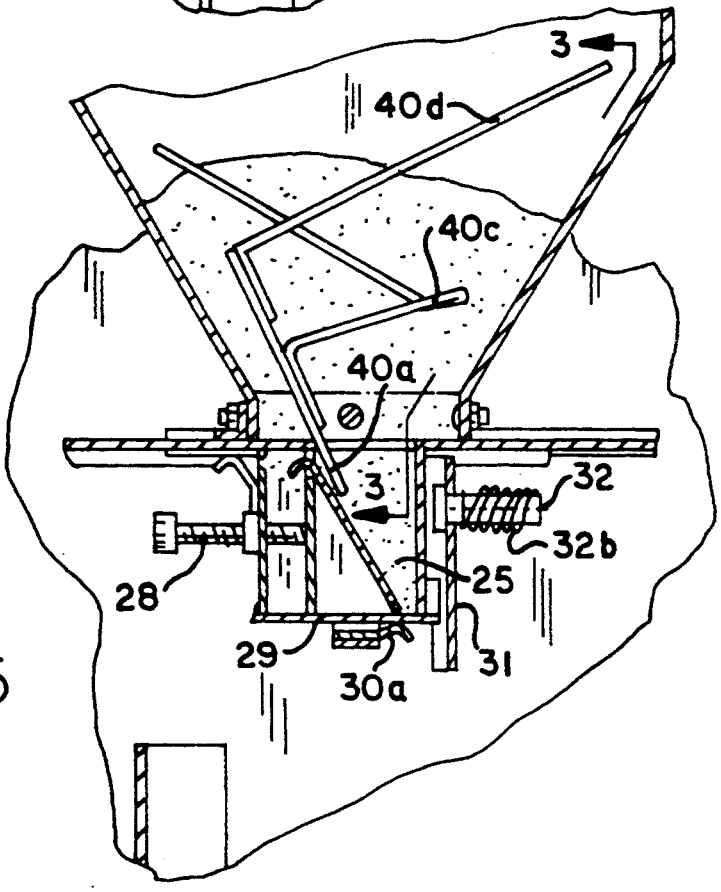

Referring to FIG. 2, a storage hopper 21 is provided and extends into the top portion of a housing 20 and is detachably supported on the top edge of housing 20 and anchored by a spring-loaded anchoring pin 22 which extends through housing 20 and into engagement with a suitable fixed latch element 22a secured to the outside of the removable hopper 21. A pair of spaced guide rails 23 are attached in parallel-aligned relation to opposite sides of the open bottom of hopper 21.

A slide and trap door batch dispenser 24 is provided and includes a generally rectangular Closure and slide plate 36 and guide flanges 26 which form a unit which is slidably mounted in the guide rails 23. The plate 36 is slightly wider than the open bottom of hopper 21 and has an opening 36a therein generally conforming in size with said open bottom of hopper 21. A generally rectangular batch measuring and receiving compartment 25 is attached to slide closure 36 and is aligned with the opening 36a in closure plate 36. A trap door 29 is pivotally mounted to the bottom of compartment 25. A batch adjusting plate 27 forms the back wall of compartment 25 and has a horizontal closure flange 27a which extends rearwardly under plate 36 in adjustable slidable relation thereto adjacent opening 36a. The width of element 27 is substantially equal to the inside of compartment 25. Element 27 is adjustably positioned inside compartment 25 by means of a thumb screw 28 threaded through the back panel of compartment 25 and is rotatably attached to the adjusting plate 27. The closure flange 27a is pressed upwardly into contact with plate 36 by a spring element 25a attached to said back panel of compartment 25. The dispenser 24 is slidably supported on guide rails 23 fixed to the bottom of the hopper 21. A trap door-closing camming spring 30a extends below the door 29 to position said spring 30a at approximately the same elevation as the bottom of the compartment 25. The spring 30a is constructed so when compartment 25 is in filling position the spring element 30a resiliently presses up against trap door 29 and holds door 29 closed against the bottom of compartment 25.

An attachment member 31 is fixed to the front panel of compartment 25 and is slotted to receive the peripheral groove 32a at the inner end of actuating rod 39. Said rod 32 extends through a bushing 33 fixed to a mounting and closure plate 20a and has a knob 34 attached to the other end. The closure plate 20a with its rod and bushing assembly is removably attached to the front of housing 20 as by the retaining pins 35 fixed to the housing and the keyhole slots (not shown) formed in the plate 20a. A return spring 32b surrounds the rod 32 and provides the resilient force to return the rod and side mechanism to closed position. When the knob is released the impact of the return motion of this mechanism acts to further prevent clogging of the powdered coffee in the hopper.

A generally curved container stop 37 is positioned below the open bottom of hopper 21 and has a slotted attachment flange 37a which is adjustably attached to the floor of housing 20 by screw 38.

In typical operation, ground coffee, or other ground material, is placed in hopper 21. Knob 34 is pushed rearwardly until it engages closure plate 20a, thereby aligning the filling opening 36a in closure plate 36 with the open bottom of hopper 21 and enabling the material in said hopper 21 to enter and fill compartment 25. A brew basket 39 or other suitable container is inserted through the access opening 20d in the front of housing 20 and is positioned under the dispenser 24 by engagement with the adjustable container stop 37. Knob 34 is then pulled out causing rod 32 to move dispenser 24 outwardly or forwardly along the rails 23. Spring element 30a extends forwardly a sufficient distance under trap door 29 so that said door will be held closed until the open bottom of hopper 21 is totally covered by closure plate 36. As trap door 29 moves out of contact with spring element 30a, the material contained in compartment 25 will be dumped into basket 39. The bushing 33 limits the distance dispenser 24 can move forwardly. After the measured batch in compartment 25 has been dumped, the rod 32 is pushed in to slide the dispenser 24 back along rails 23 with the compartment 25 aligned with the open bottom of hopper 21. The spring element 30a forces trap door 29 to swing up into closed position to allow the coffee to again fill compartment 25 with the next batch.

The amount of coffee, or other material, dispensed at each cycle of dispenser 24 is easily adjusted by turning thumb screw 28 which in turn moves adjusting plate 27 and varies the size of compartment 25. The entire dispenser 24 may be removed as a unit for cleaning and adjusting by lifting plate 20a and sliding the dispenser 24 unit out through the upper portion of an opening which extends upwardly behind the closure plate 20a in front of housing 20 and is of sufficient size to permit said dispenser unit 24 to pass therethrough. The hopper 21 can also be easily removed from housing 20 for cleaning by pulling the spring loaded stop pin 22 out of its locking position in engagement with the latch element 22a and then lifting hopper 21 out of the housing.

The present invention includes an agitator 40 which in the form shown includes a depending agitator arm 40a which extends downwardly from its pivotal mounting on pivot shafts 40b in the sides of the hopper 21. The lower agitator element 40a normally rides on the top surface of the pivoted closure plate. However, whenever the closure plate is shifted into dumping position the force of the spring 41 will cause the agitator arm 40a to swing downwardly through the discharge opening 36a to ensure the flow of the coffee through in the bottom of the hopper 21 downwardly into the measuring compartment 25. The top surface of dispenser trap door 24 will cam the lower agitator loop 40a back up into retracted position in the bottom of the hopper 21 when the dispenser door 24 is returned to its closed position. The actuator activating spring 41 is attached to an activating arm 42 fixed to one of the pivot shafts 40b outside the hopper 21.

In the form shown, the agitator 40 includes two additional agitator loop structures, respectively designated by the numerals 40c and 40d, which are positioned in criss-cross relation above the bottom of the hopper and slope upwardly and across the hopper to positively prevent any clogging or bridging of the finely powdered coffee contained in the upper portion of the hopper.

It will be seen that this invention provides an improvement on the dispenser shown in my prior U.S. Pat. No. 4,168,019 and adapts the batch unit dispenser mechanism for use with the powdered coffee product now being used with commercial coffee machines.

What is claimed is:

1. A ground coffee dispenser comprising
    a hopper for storing a supply of ground coffee to be dispensed,
    said hopper having a bottom discharge opening with side walls sloping downwardly to the discharge opening,
    an agitator pivotally mounted in the hopper and having a spring-loaded arm portion swinging downwardly through the said discharge opening during the discharge of coffee therethrough, and including a spring to urge the arm portion downwardly,
    a slide closure plate having an open discharging position and a closed position for normally closing the discharge opening to support the lower end of the spring-loaded agitator arm portion riding on the top surface of the plate when the same is in closed position,
    a batch measuring compartment aligned with the hopper discharge opening to receive a measured batch of coffee therethrough and having a discharge trap door at the bottom thereof for closing the compartment when the closure plate is in said open position, but swinging down into open dumping position when the slide closure plate is moved into said closed position,
    means for activating said closure plate to slide the same into said open position for discharging material through said opening and associated with said agitator to permit the spring to oscillate the arm portion downwardly into the opening whenever the closure plate is shifted from said closed position to said open position to agitate the coffee and ensure the free flowing action of the coffee through the opening when the closure plate is in said open position.

2. The structure set forth in claim 1 wherein the agitator includes a plurality of agitator arms extending upwardly into the hopper so that when the lower arm portion is shifted downwardly by actuation of the closure plate the other arms are also oscillated to prevent bridging in the upper portions of the hopper.

3. The structure set forth in claim 2 wherein the actuating arms are in the form of wire loops respectively extending into close association with the inside wall surfaces of said hopper.

4. The structure set forth in claim 1 wherein said means for activating the closure plate includes a control member connected to said slide closure plate for actuation by an operator to dispense a measured batch of coffee from said measuring compartment and including a return spring for yeildably holding the said control member and therethrough said measuring compartment in said closed position, but permitting the same to be shifted into said open dumping position by activating said control member against said tensioning spring.

5. The structure set forth in claim 1 further comprising; a sloping compartment panel forming one side of the batch measuring compartment and hinged at the upper end thereof adjacent the closure plate, said panel swinging downwardly about said hinge into a substantially vertical position when the discharge trap door is moved into said open position to discharge the measured quantity of material from the measuring compartment to thus prevent clogging of the material in the batch measuring compartment.

* * * * *